Jan. 3, 1933.    C. W. USCHMAN ET AL    1,893,380
SOLDERING APPARATUS
Filed Oct. 31, 1930

Inventors:
Carl W. Uschman;
Howard W. Hartman,
by Charles V. Tullar
Their Attorney.

Patented Jan. 3, 1933

1,893,380

UNITED STATES PATENT OFFICE

CARL W. USCHMAN, OF SCHENECTADY, AND HOWARD W. HARTMAN, OF SCOTIA, NEW YORK, ASSIGNORS TO GENERAL ELECTRIC COMPANY, A CORPORATION OF NEW YORK

SOLDERING APPARATUS

Application filed October 31, 1930. Serial No. 492,539.

The present invention relates to an apparatus and improved process for heating metal structures and more particularly to an apparatus and process which may be employed to solder metal sleeves to electrodes such as vacuum tube anodes and the like. Although the apparatus disclosed in the present case is particularly adapted for use in connection with soldering, it is not limited to such use but may be employed with equal facility in conjunction with high frequency degassing of tube parts.

It is one of the objects of the present invention to provide a brazing or soldering method in which the brazed article is subjected to a minimum amount of contamination in the brazing process. It is a further object of the invention to provide a jig for the support of the article to be brazed or soldered which may be rapidly cooled.

Figure 1:
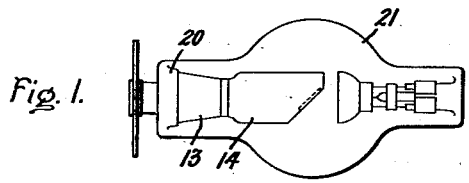

The novel features which are characteristic of our invention are set forth with particularity in the appended claims. The invention itself however, will best be understood from reference to the following specification when considered in connection with the accompanying drawing in which Fig. 1 is an elevation of an X-ray tube containing an anode similar to that disclosed in Fig. 2, while Fig. 2 is a vertical cross section of an apparatus whereby my invention may be carried into effect.

Referring more particularly to the drawing, we have indicated at 1 a glas bell jar mounted on a supporting plate 2, the latter having a central opening 3 which may be connected with an evacuating pump, not shown. The upper end of the bell jar is closed by means of a jig 4 made of metal and comprising a flat plate 5 and a hollow metal receptacle 6 secured in any suitable manner to the underside of the plate 5. The lower end of receptacle 6 is provided with a screw-threaded stud 7 which is adapted to support a part to be brazed or soldered or otherwise subjected to the action of heat. The jig 4 is sealed to the bell jar and the latter sealed to the plate 2 by wax joints 8 and 9 respectively. A tubular metal coil 10 is mounted on the outer surface of the plate 5 and in close contact therewith and is supplied with a circulating cooling fluid such as water. A circulating cooling fluid may also be supplied to the receptacle 6 by means of an inlet pipe 11 and an outlet pipe 12.

Figure 2:
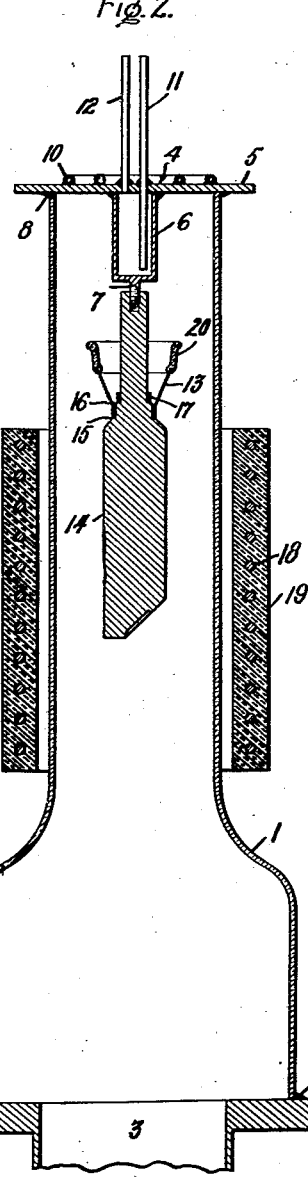

The article or device to be brazed or soldered is secured to the screw-threaded stud 7, as indicated in Fig. 2. In the latter figure there is disclosed, as an example of our invention, an arrangement for soldering a copper sleeve 13 to an X-ray anode 14. The anode is provided near the reduced end thereof with two shoulder portions or ledges 15 and 16 on the lower of which 15, the copper sleeve 13 is centrally positioned so that it does not project at any point beyond the ledge. A thin strip of silver solder 17 in the form of a split ring, is mounted within the sleeve 13 and on the upper ledge 16 which is adjacent the lower end of the sleeve. An adjustable coreless coil 18 encased in or supported by suitable insulating material 19 is adjustably mounted on the exterior of the bell jar and adapted to be connected to a suitable source of high frequency current.

In operation, the high frequency coil 18 is positioned so as to surround the lower portion of the anode 14 and extend up to a point adjacent the ledge 15. When the bell jar has been evacuated to a desired degree, high frequency current is supplied to coil 18. The silver solder 17 melts and flows into and practically fills the small space between the lower portion of sleeve 13 and the electrode 14. At the same time cooling fluid is circulated through the tubular coil 10 to prevent melting of the wax joint 8.

In heating the solder, the current and frequency employed may be varied widely without departing from the scope of our invention. As an example, for silver soldering a copper sleeve such as sleeve 13, to the particular type of X-ray anode disclosed in Figs. 1 and 2, a frequency of about three million cycles is usually employed. It is desirable to raise the temperature of the anode 14, the copper sleeve 13 and the glass collar 20 attached to sleeve 13 at a certain rate in order to avoid any deterioration of the copper glass seal. Temperature control may be accomplished by placing an ammeter in the circuit of coil 18 or by observing the input kilowatt energy to the circuit. For the type of anode shown in Figs. 1 and 2 about 1.57 kilowatts energy are applied for about three minutes when it is increased to about 2.70 kilowatts for about two minutes, then raised to 5.10 kilowatts for five minutes and finally increased to about 6.17 kilowatts and held at that value until the solder has melted and the joint between the sleeve and anode is completed. The high frequency energy is reduced to zero about five seconds after the solder ring 17 has melted and a stream of water then circulated through receptacle 6 for about forty-five minutes to thereby cool anode 14 by conduction. Water is circulated through coil 10 throughout both the heating and cooling periods.

It is particularly desirable to avoid any contamination of anodes employed in X-ray apparatus, for example the formation of an oxide coating on that portion of the anode which is mounted within the usual evacuated container. For this reason, the electrode 14 is handled only at its reduced end and is not exposed to air until it is cooled to approximately room temperature and is even then not handled directly.

Ordinarily, without the use of the cooling fluid in receptacle 6, about eight hours would be required to fire three anodes. When using the water cooled jig however, about six to eight anodes may be fired in the same period of time.

We have illustrated in Fig. 1 an X-ray tube comprising an envelope 21 in which anode 14 may be mounted. In the arrangement disclosed, the anode is secured to the glass envelope 21 by means of the glass collar 20 which may be welded to the collar 13 and envelope 20 in a manner well known to those skilled in the art.

Although we prefer to evacuate the bell jar 1 through the opening 3 in supporting plate 2, it will be clear that evacuation may be accomplished if desired through an opening in plate 5 rather than through the supporting base 2.

The silver solder which we prefer to employ is a eutectic composition consisting of 72% silver and 28% copper and has a melting point of about 778° C. Our invention however is not limited to the use of any particular solder. When a solder of the above composition is used, it is desirable to adjust the heating coil 18 to the approximate position indicated in Fig. 2 in order that the amount of heat supplied to the solder may not be excessive. The solder employed as well as the metal of the electrode 14 are both vacuum melted to reduce as far as possible the quantity of gas contained therein.

What we claim as new and desire to secure by Letters Patent of the United States, is:

1. In combination, a container, a closure member therefor, said closure member including a plate, a hollow receptacle secured to said plate, a coil mounted on said plate, means for securing a device on said hollow receptacle and within said container, means for supplying a cooling medium to said receptacle and coil, and means including a coreless coil for supplying heat to said device.

2. In combination, a container, a closure member therefor, said closure member including a plate, a hollow receptacle secured to said plate, a coil mounted on said plate, means for securing a device on said hollow receptacle and within said container, means for supplying a cooling fluid to said receptacle and coil, means including a coreless coil for supplying heat to said device, and means for evacuating said container.

In witness whereof, we have hereunto set our hands this 30th day of October, 1930.

CARL W. USCHMAN.
HOWARD W. HARTMAN.